(12) United States Patent
Sakai

(10) Patent No.: US 9,781,088 B2
(45) Date of Patent: Oct. 3, 2017

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Katsuya Sakai, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 132 days.

(21) Appl. No.: 14/556,663

(22) Filed: Dec. 1, 2014

(65) Prior Publication Data

US 2015/0163214 A1 Jun. 11, 2015

(30) Foreign Application Priority Data

Dec. 9, 2013 (JP) ................ 2013-254496

(51) Int. Cl.
*H04L 9/00* (2006.01)
*H04L 29/06* (2006.01)
*G06F 17/30* (2006.01)
*G06F 21/31* (2013.01)

(52) U.S. Cl.
CPC .............. *H04L 63/08* (2013.01); *G06F 17/30* (2013.01); *G06F 21/31* (2013.01); *H04L 63/083* (2013.01)

(58) Field of Classification Search
CPC ....... H04L 63/08; H04L 63/083; G06F 21/31; G06F 17/30; H04N 2201/0094
See application file for complete search history.

(56) References Cited

U.S. PATENT DOCUMENTS

| 8,353,007 B2 * | 1/2013 | Gordon ................. H04W 12/06 726/2 |
| 8,392,973 B2 * | 3/2013 | Bank ....................... G06F 21/31 726/1 |
| 2007/0294610 A1 * | 12/2007 | Ching ............... G06F 17/30014 |

FOREIGN PATENT DOCUMENTS

JP 2012-185651 A 9/2012

* cited by examiner

*Primary Examiner* — Beemnet Dada
(74) *Attorney, Agent, or Firm* — Carter, DeLuca, Farrell & Schmidt, LLP

(57) ABSTRACT

By a Web browser, an authentication screen is displayed based on HTML data received from a Web server, and authentication information inputted via the authentication screen is managed. Upon a display of the authentication screen, in a case where it is set to display an address of the HTML data as the identification information of the authentication screen, the address of the HTML data is displayed in a case where the title of the authentication screen does not exist, and in a case where it is set to not display the address of the HTML data as the identification information of the authentication screen, a predetermined character string is displayed in a case where the title of the authentication screen does not exist.

20 Claims, 16 Drawing Sheets

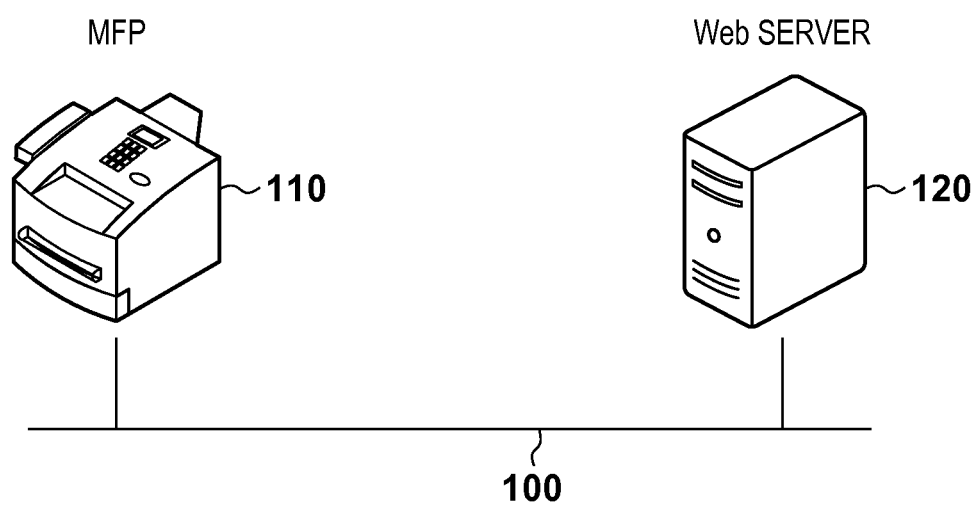
F I G. 1

F I G. 5
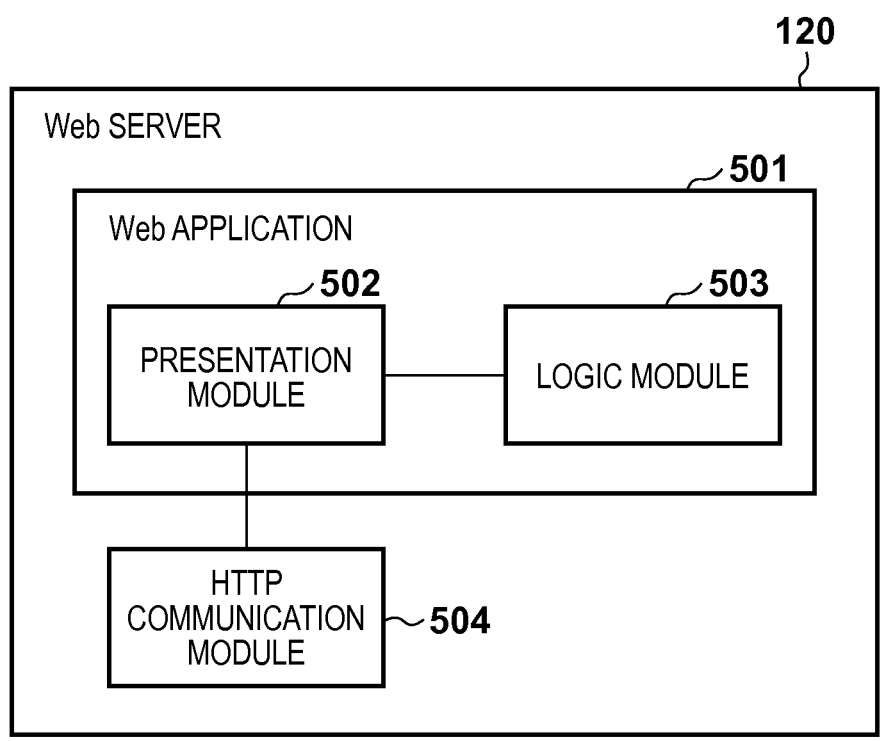

FIG. 7

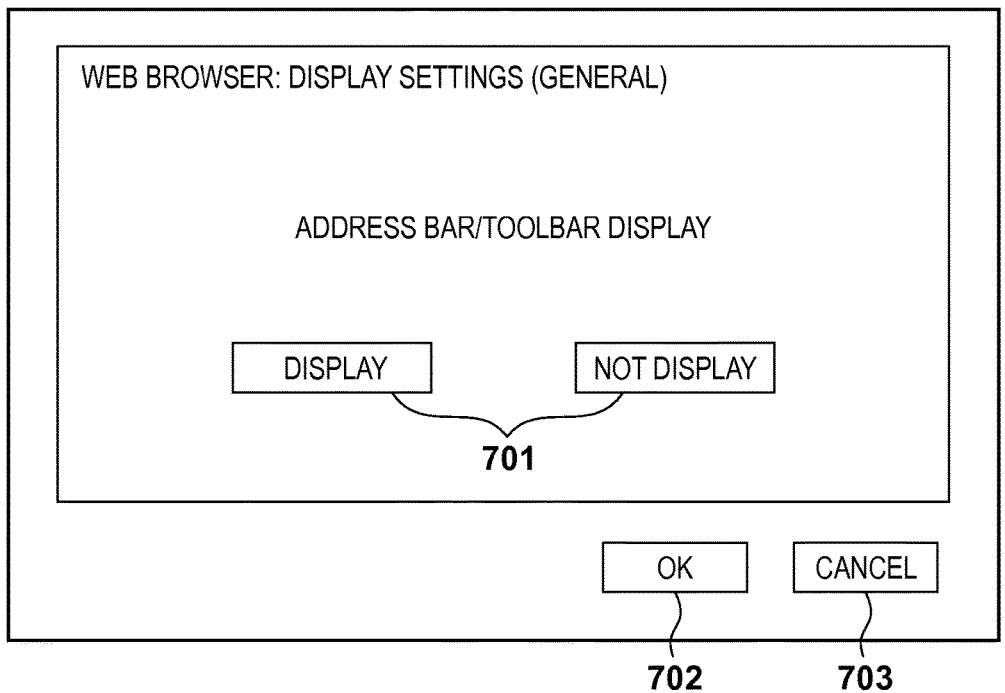

FIG. 8

```
<!DOCTYPE html PUBLIC "- //W3C//DTD XHTML 1.0 Transitional//EN"
   "http://www.w3.org/TR/xhtml1/DTD/xhtml1 - transitional.dtd">
   <html xmlns="http://www.w3.org/1999/xhtml">
<head>
  <title>Service1 LOGIN </title>                                        ─── 801
</head>
<body>
      <form method="post" action="login.html">
   <p>    ENTER USER NAME AND PASSWORD    </p>
     <div class="c1">
        <p>    USER NAME    <input name="username" type="text" /></p>    ─── 802
        <p>    PASSWORD    <input name="password" type="password" /></p> ─── 803
     </div>
        <input type="submit" value="LOGIN" />                           ─── 804
   </form>
</body>
</html>
```

FIG. 9

| url | title | id | password |
|---|---|---|---|
| http://www.serverA.com/service1/login.html | Service1 LOGIN | abc | xyz |
| http://www.serverA.com/service2/login.html | USER AUTHENTICATION | abc123 | Zz12345 |
| http://www.serverB.com/logon.html | (null) | abc | xyz123 |

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

Displaying an operation screen provided by a Web server with a Web browser that an information processing apparatus, such as a PC, is provided with, where the information processing apparatus is connected to the Web server which is on a network is known. Also, a form-based authentication in which, in order to perform a user authentication for a Web application on a Web server, an authentication is performed on an authentication screen displayed by the Web browser, is known. In such a case, when a user designates a URL of a form-based authentication screen to a Web browser of an information processing apparatus, the Web browser makes a request to the Web application for the authentication screen. Then the Web application, in response to the request, responds to the Web browser with an HTML file for causing the Web browser to display the form-based authentication screen. With this, the Web browser analyzes the received HTML file, and displays the form-based authentication screen based on the description of the HTML file. Then, the user inputs authentication information on the form-based authentication screen, and when the user performs a processing request (submits) of the form, the Web browser transmits the content of the form to the Web server. Then, the Web application on the Web server, having received this notification, performs a user authentication based on the content of the form.

In a system that uses a Web server and a Web browser in this way, it is necessary for a user to input this kind of authentication information every time. An auto-complete function in which a Web browser stores values that the user input in a form-based authentication of various Web applications for cutting out this effort (a form-based authentication information management function) is known. Also, values stored in this way are managed for each site (URL), and it is possible to confirm by a list what kind of information is stored for a particular site (URL).

Also, as in the invention recited in Japanese Patent Laid-Open No. 2012-185651, in recent years, there are MFPs (Multi Function Peripheral) equipped with a scanner and a printer that are provided with a Web browser auto-complete function as described above.

However, in an embedded browser such as those that operate on MFPs, unlike Web browsers of standard PCs, operation is envisioned in which the user is not caused to be conscious of the URL. For example, operation is such that the toolbar and the address bar of the browser are set to be non-displayed, and a system administrator only allows a general user to use Web applications that the system administrator sets in advance. In a case where this kind of operation is performed, the user cannot be conscious of the URL of the page that he or she is accessing. For this reason, there is a problem in that it is difficult for a general user to understand what authentication information corresponds to what screen even if a URL and the authentication information corresponding to the URL are displayed in a list as in a password management screen of a PC.

SUMMARY OF THE INVENTION

An aspect of the present invention is to eliminate the above-mentioned problems with conventional technology.

A feature of the present invention is to provide a technique in which authentication information input on an authentication screen is managed in association with the authentication screen, and when the authentication information is displayed, a situation where a user sees unnecessary information and is confused is avoided.

The present invention provides an information processing apparatus comprising: a display unit configured to display an authentication screen based on HTML data received from a Web server; a management unit configured to manage authentication information inputted via the authentication screen; a setting unit configured to set identification information of the authentication screen to be displayed in a case where a title of the authentication screen does not exist; and a control unit configured to control so as to, upon a display of the authentication screen, in a case where the setting unit sets so as to display an address of the HTML data as the identification information of the authentication screen, display the address of the HTML data in a case where the title of the authentication screen does not exist, and in a case where the setting unit does not set so as to display the address of the HTML data as the identification information of the authentication screen, display a predetermined character string in a case where the title of the authentication screen does not exist.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 depicts a view for showing an overall configuration of a communication system according to a first embodiment of the present invention.

FIG. 5 is a functional block diagram for explaining a configuration of software modules of the Web server according to the first embodiment.

FIG. 7 depicts a view illustrating an example of a display setting screen of the Web browser of the MFP according to the first embodiment.

FIG. 8 depicts a view illustrating an example of HTML data when the Web browser screen of FIG. 6A or FIG. 6B is displayed on the console unit of the MFP according to the first embodiment.

FIG. 9 depicts a view illustrating an example of form-based authentication information managed by a form data table of the MFP according to the first embodiment.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

Note, in this embodiment, explanation will be given for a multi function peripheral as example of an information processing apparatus according to the present invention, but the information processing apparatus may also be a computer device such as a PC, a mobile terminal.

[First Embodiment]

FIG. 1 depicts a view for showing an overall configuration of a communication system according to a first embodiment of the present invention.

Figure 2:
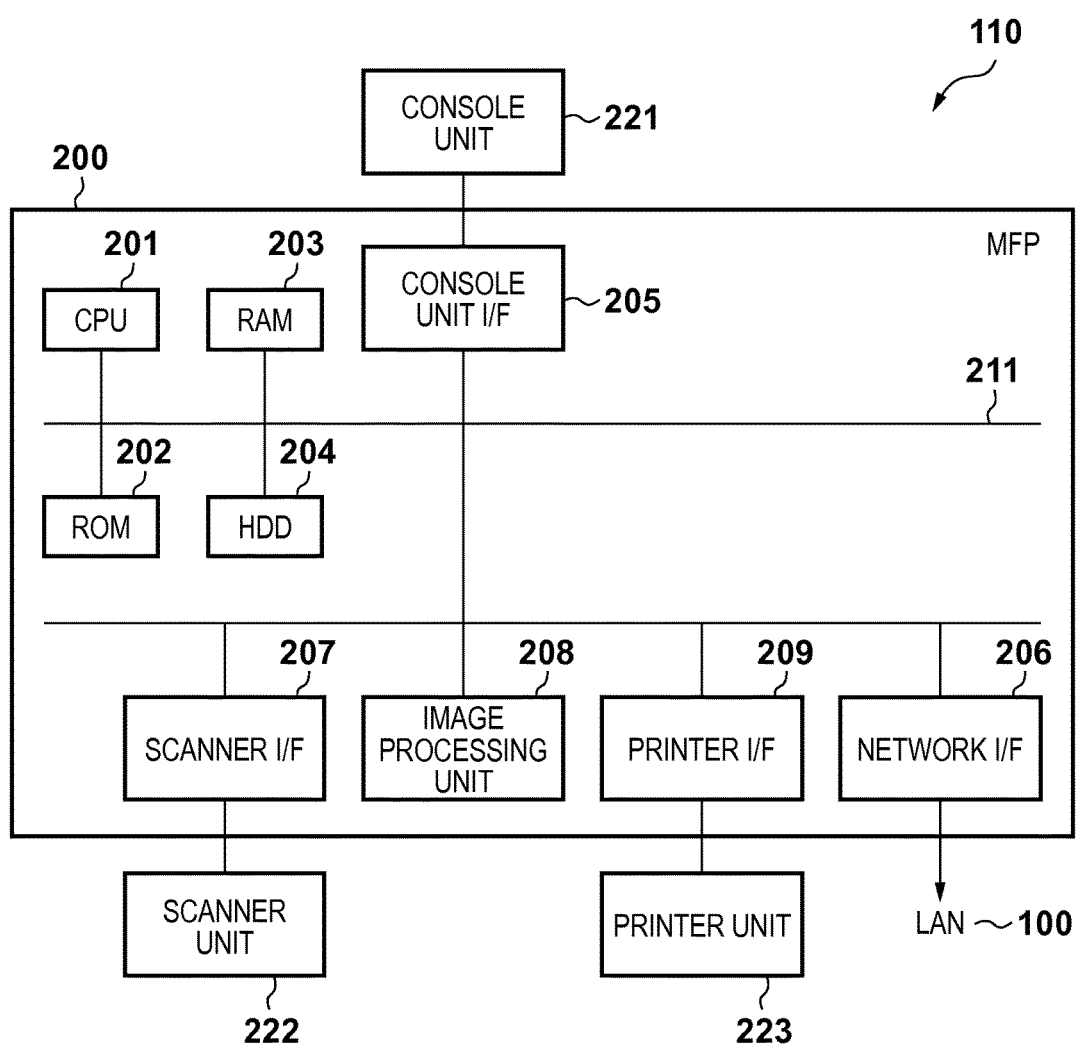
FIG. 2 is a block diagram for explaining a hardware configuration of an MFP according to the first embodiment.

This communication system has an MFP 110 and a Web server 120, and these are connected via a LAN 100 such as an Ethernet (registered trademark). The MFP 110, as will be explained later with reference to FIG. 2, is a multi function peripheral having a console unit, a scanner unit, and a printer unit. The Web server 120 is a server executing a Web application used from a Web browser of the MFP 110. However, the devices that constitute the communication system according to this embodiment are not limited the devices shown in FIG. 1.

FIG. 2 is a block diagram for explaining a hardware configuration of the MFP 110 according to the first embodiment.

The MFP 110 is equipped with a console unit 221, a scanner unit 222 which is an image input device, a printer unit 223 which is an image output device, and a controller unit 200 which is responsible for controlling the MFP 110. The console unit 221 has a touch panel display, or the like, and has functions of displaying information to a user, and accepting input by a user. The scanner unit 222 generates image data by performing a read operation on an image of an original. The printer unit 223 forms (prints) image data received from the controller 200 on paper (a sheet) as an image. The controller 200 is electrically connected to the console unit 221, the scanner unit 222, and the printer unit 223 on one side, and also connected to the LAN 100 via a network I/F 206. In other words, the controller 200 is connected to other devices via the LAN 100. Because of this, communication by an HTTP protocol via the LAN 100 is possible.

A CPU 201, in accordance with a control program stored in an HDD 204 controls access to various connected devices and access from other apparatuses comprehensively. Also, the CPU 201 controls comprehensively various processing performed internally in the controller 200. This control encompasses execution of programs for realizing the later described flowcharts. In a ROM 202 is stored a boot program of the apparatus. A RAM 203 is a system work memory for operation of the CPU 201, and the RAM 203 is a memory for temporarily storing image data. The RAM 203 is provided with an area for storing content stored upon a power source backup, or the like, after the apparatus body is powered off, and an area in which content stored after powering off is cleared. The HDD 204 is a hard disk drive that stores system software that is executed by the CPU 201 and image data. A console unit I/F 205 is an interface unit for connecting a system bus 211 and the console unit 221. The console unit I/F 205 receives image data for display to the console unit 221 from the system bus 211 and outputs the image data to the console unit 221, and also outputs information input from the console unit 221 to the system bus 211. The network I/F 206 is connected to the LAN 100 and the system bus 211, and performs input and output of information via the LAN 100. A scanner I/F 207 performs correction, processing, and editing on image data received from the scanner unit 222. Note that the scanner I/F 207 has a function for determining whether received image data is a color original or a black-and-white original, or whether it is a character original or a photo original, or the like.

The image processing unit 208 performs an image data orientation conversion, an image compression, or decompression processing. Also, it is possible to execute image processing for composing image data stored in the HDD 204 into a single image. A printer I/F 209 receives processed image data output from the image processing unit 208 and, referencing attribute data attached to the image data, converts the image data into print data. Print data obtained in this way is output to the printer unit 223 and printed onto a printing medium (a sheet). Note that in the first embodiment, the MFP 110 is a network MFP that executes a UI display, but the MFP 110 may be an image processing apparatus other than this such as a general-purpose computer connected to a general purpose scanner and a general purpose printer.

Figure 3:
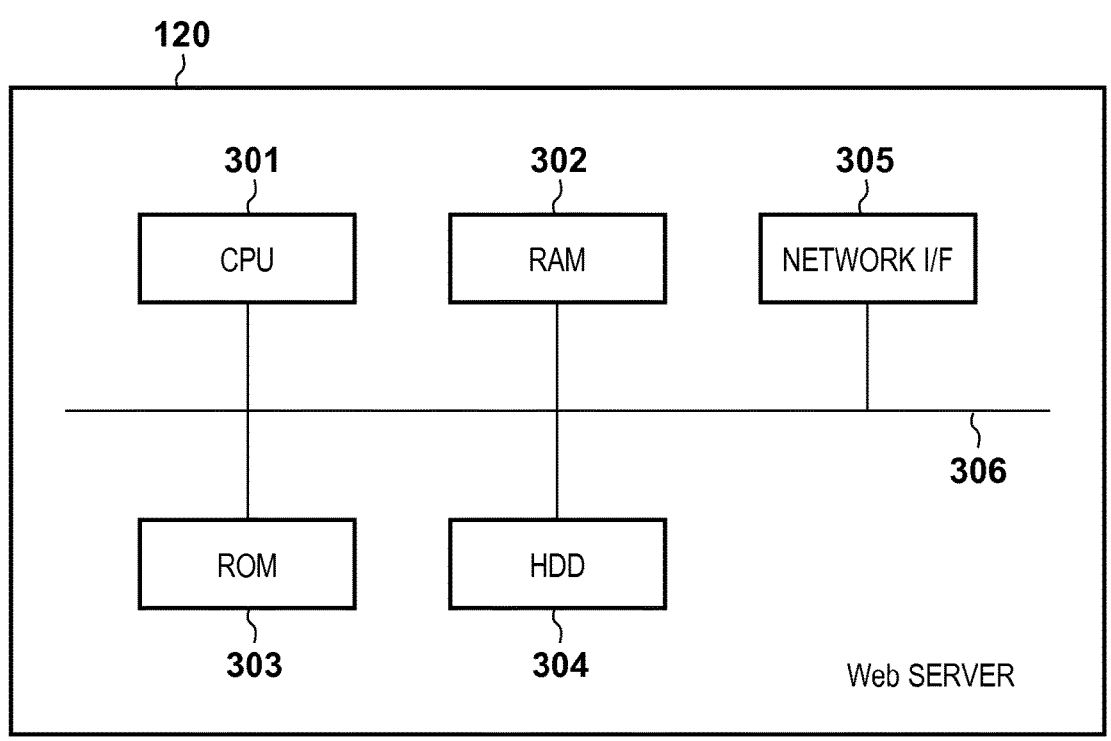
FIG. 3 is a block diagram for showing a hardware configuration of a Web server according to embodiments.

FIG. 3 is a block diagram for showing a hardware configuration of the Web server 120 according to embodiments.

In the Web server 120, a CPU 301, a RAM 302, a ROM 303, a network I/F 305, and a hard disk drive (HDD) 304 are connected so as to be able to communicate with each other via a system bus 306. In the ROM 303 or the HDD 304, control programs such as an operating system or applications are stored. The CPU 301, by deploying, from the HDD 304 into the RAM 302, and executing these control programs as necessary, provides functions as a computer. Also, the CPU 301 performs communication with other apparatuses on the LAN 100 that are connected via the network I/F 305.

Figure 4:
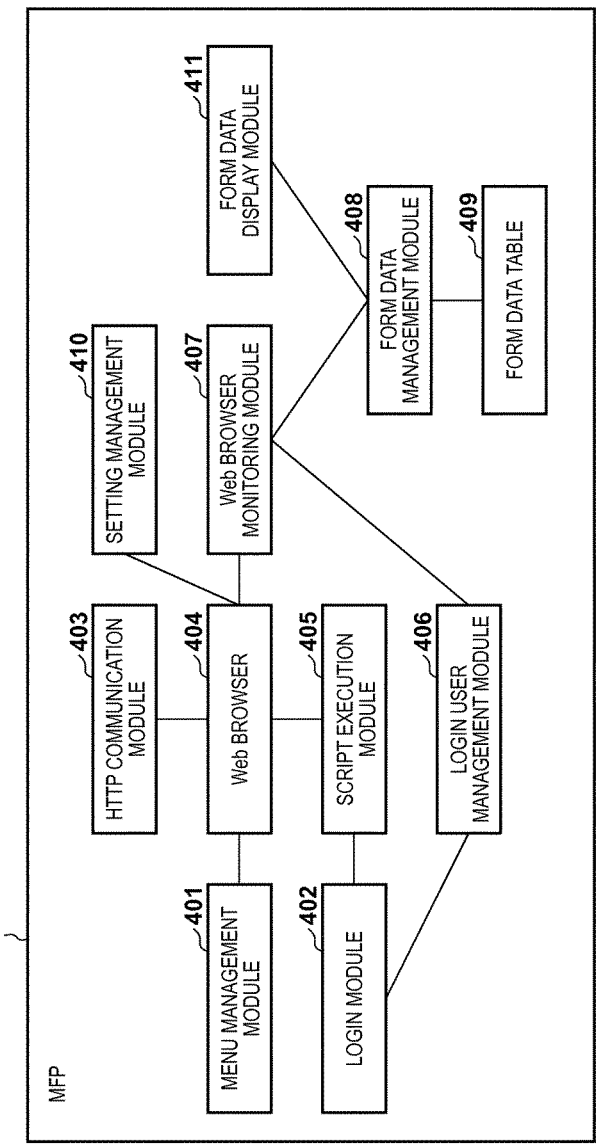
FIG. 4 is a functional block diagram for explaining a configuration of software modules that execute communication processing in the MFP according to the first embodiment.

FIG. 4 is a functional block diagram for explaining a configuration of software modules that execute communication processing in the MFP 110 according to the first embodiment. These software modules are stored in the HDD 204 of the MFP 110, and by the CPU 201 deploying, from the HDD 204 into the RAM 203, and executing these software modules, corresponding functions are realized.

A menu management module 401 displays a menu screen for activating software modules of the MFP 110. This menu screen has a function of allowing a user to select a desired function, or the like, by displaying a GUI button for displaying a copy screen, or a later described Web browser screen in a list. A login module 402 allows a user to input login information for identifying the user using the MFP 110, and generates login user information by performing an authentication of the user. The login module 402 holds user information for users that can use the MFP 110, and performs the authentication of a user using this user information. A user login approach using the login module 402 may be an approach of allowing input of a user ID and a password by a software keyboard displayed on the console unit 221, or it may be usage of an IC card. In the first embodiment, the login module 402 holds user information, but configuration may be taken in which authentication is performed by input authentication information being transmitted to an external user information management server, and login information being received.

An HTTP communication module 403 performs communication by an HTTP protocol by operating the network I/F 206. A Web browser 404 performs communication with devices on a network via the HTTP communication module 403. The Web browser 404 makes a request for HTML data to the Web application in accordance with a specified URL. Also, the Web browser 404 renders the HTML data, included in the response received via the HTTP communication module 403, and displays to the console unit 221, and also transmits, as a request, input made with respect to an operation screen displayed on the console unit 221. A script execution module 405 is a JavaScript execution module of the Web browser 404 which interprets JavaScript that the Web browser 404 read in, operates content on the Web browser 404, and performs communication using the HTTP communication module 403. A login user management module 406 holds and manages user information such as IDs and mail addresses of users logged into the MFP 110.

A Web browser monitoring module 407 monitors operation of the Web browser 404, determines a URL that the Web browser 404 is displaying, determines whether or not HTML is being read in, and determines whether the Web browser 404 is being displayed. Also, the Web browser monitoring module 407 makes a notification to a form data management module 408 when the Web browser monitoring module 407 detects a form transmission from the Web browser 404. The form data management module 408 analyzes form data that is being transmitted, and performs management of input form-based authentication information. A form data table 409 is a database that holds form-based authentication information. A setting management module 410 manages various settings values such as display settings and operation settings of the Web browser 404. In the first embodiment, a setting for switching the display/non-display of the toolbar and the address bar of the Web browser 404, and setting values for the content that a form data display module 411 displays are managed. The form data display module 411 has a function of displaying a confirmation screen (for example FIG. 11A or FIG. 11B) on the console unit 221 in a list format in order to present form-based authentication information saved in the form data table 409 to a user.

FIG. 5 is a functional block diagram for explaining a configuration of software modules of the Web server 120 according to the first embodiment.

The Web server 120 is provided with a Web application 501 and an HTTP communication module 504. This software is stored in the HDD 304 of the Web server 120, deployed into the RAM 302, and executed by the CPU 301. The Web application 501, in accordance with a request from the Web browser 404 of the MFP 110, transmits, as a response, HTML data for a form-based authentication screen, HTML data for an operation screen for controlling the MFP 110, an instruction for image processing, or the like. As a configuration for doing this, the Web application 501 is equipped with a presentation module 502 and a logic module 503. When the presentation module 502, via the HTTP communication module 504, receives an HTTP request from the Web browser 404, in response to the request, the presentation module 502 transmits screen information to be displayed as a response. Also, form data input via a screen displayed to the Web browser 404 is received via the HTTP communication module 504. The logic module 503 performs processing for form data transferred from the presentation module 502. For example, the logic module 503 performs a user authentication in accordance with information that a user input into a form of an authentication screen, and instructs a screen to be displayed, and in accordance with the information input by the form data that the user sets, the MFP 110 generates job definition information for executing a function of the MFP 110. An HTTP communication module 504 performs communication by an HTTP protocol by operating the network I/F 305.

Figure 6A:
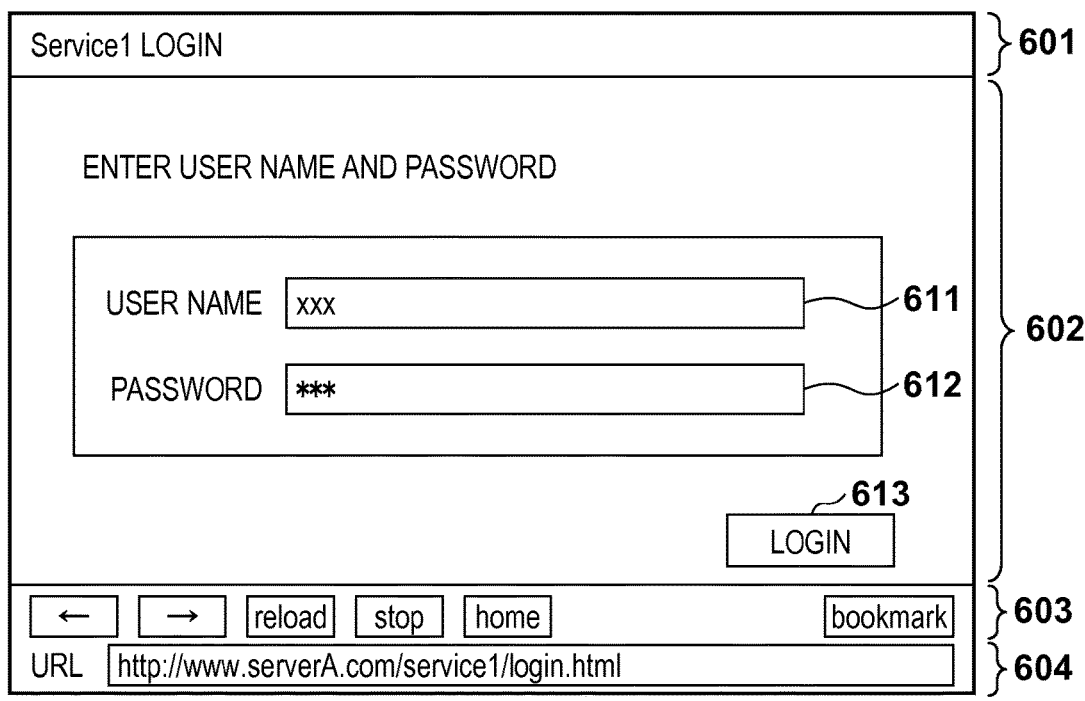
FIGS. 6A and 6B depict views illustrating examples of a login screen of the Web browser which is displayed on a console unit of the MFP according to the first embodiment.
Figure 6B:
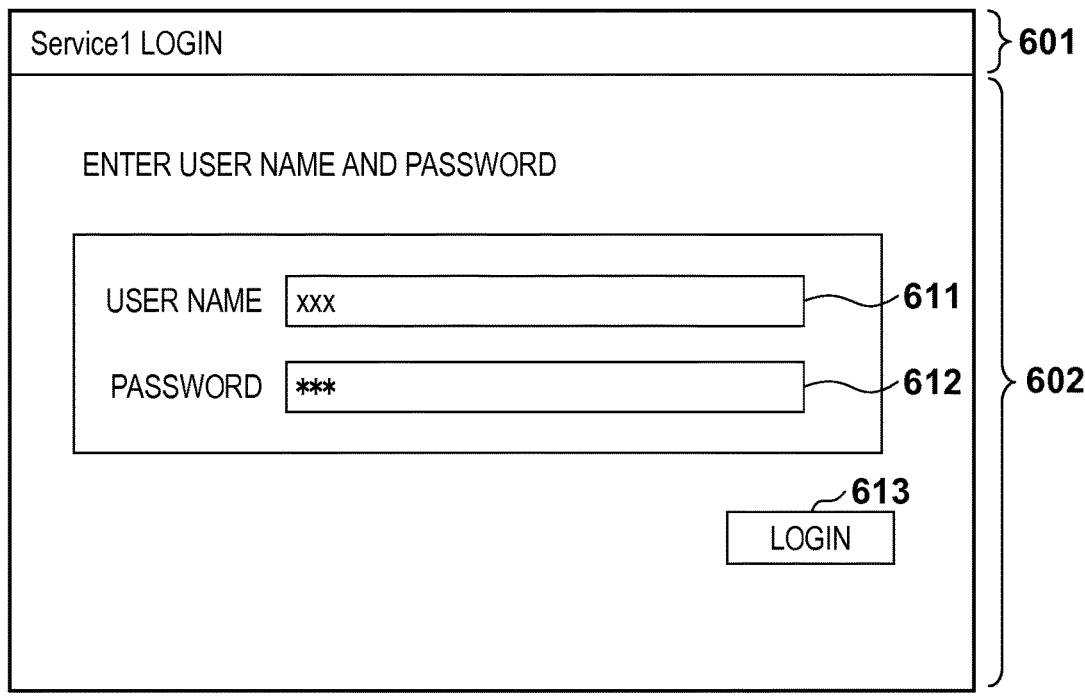

FIG. 6A and FIG. 6B depict views illustrating examples of a login screen of the Web browser which is displayed on the console unit 221 of the MFP 110 according to the first embodiment.

FIG. 6A illustrates an example login screen of a service 1 in a case where on a setting screen shown in later explained FIG. 7, display of the address bar/toolbar is set to "display". In a title display area 601, a title of a Web page displayed by the Web browser 404 is displayed. In this example "Service1 Login" is the title. A content display area 602 displays content of the Web page. In this example, a form-based authentication screen is displayed. A tool bar display area 603 displays, from the left, a back button for returning to the page that was displayed previously, a forward button for proceeding to a next page, a reload button for re-reading a page, a stop button for stopping in a case where reading is in progress, and a home button for displaying a bookmark list. An address bar display area 604 displays an address (URL) of the Web page that is currently being displayed on the screen.

In the content display area 602, a user name input field 611 and a password input field 612 are authentication target user name and password input areas, respectively. Also a login button 613 is a submit button for the user to make an instruction to login.

FIG. 6B illustrates an example of a screen in a case where on the setting screen of later explained FIG. 7, the address bar/toolbar display is set to "do not display". Portions common to FIG. 6A are shown with the same reference numerals, and their explanation will be omitted. In FIG. 6B, the tool bar display area 603 and the address bar display area 604 which are shown in FIG. 6A are not displayed.

FIG. 7 depicts a view illustrating an example of a display setting screen of the Web browser 404 of the MFP 110 according to the first embodiment.

This screen is displayed by a Web browser display setting being selected in a setting screen (not shown) of the MFP 110. The selection buttons 701 are buttons for exclusively selecting either to "display" or to "not display" the address bar/toolbar, and the selection buttons 701 are always in a state such that one of them is selected (a pressed state). In other words, when one of the buttons is pressed, the pressed button enters the selected state, and the other button enters a deselected state. An OK button 702 is a button for confirming the setting content selected with the setting buttons 701. A cancel button 703 is a button for leaving the setting screen without performing the settings of the setting screen. It is possible to switch the display of the address bar and the toolbar of the Web browser by modifying the setting content with the selection buttons 701 and pressing the OK button 702 as in the previously described FIG. 6A and FIG. 6B.

FIG. 8 depicts a view illustrating an example of HTML data for when a Web browser screen is displayed on the previously described FIG. 6A or FIG. 6B on the console unit 221 of the MFP 110 according to the first embodiment. Note that in FIG. 8, as with a definition in the settings of a style sheet, that which is unrelated directly to the explanation of the embodiments is omitted.

A title tag 801 is an element for indicating a title of the screen constituted by the HTML data, and "Service1 Login" is set in accordance with FIGS. 6A and 6B. An input tag 802 is an element for inputting a user name that the Web application 501 manages, and the input tag 802 corresponds to a display of the user name input field 611 of FIGS. 6A and 6B. An input tag 803 is an element for inputting a password that the Web application 501 manages, and the input tag 802 corresponds to a display of the password input field 612 of FIGS. 6A and 6B. An input tag 804 is an element for submitting to the Web application 501 form input information and the input tag 804 corresponds to a display of the login button 613 of FIGS. 6A and 6B.

FIG. 9 depicts a view illustrating an example of form-based authentication information managed by the form data table 409 of the MFP 110 according to the first embodiment. Note that the form-based authentication information is saved for each user capable of logging into the MFP 110.

A url 901 is a URL of the form-based authentication screen. A title 902 is a title tag defined in HTML data of the form-based authentication screen. In a case where the title tag does not exist, "null" is saved. An id 903 is a character string for a type attribute of text that exists immediately prior to a password 904 and is input into a form, and the id 903 corresponds to a user name which is identification information of a user. The password 904 is a value for a type attribute of password that is input into the form (for example, the input tag 803). In a case where there are a plurality of passwords in the HTML data, the value that is first found is saved.

For example, in a case where, by the HTML data of FIG. 8, the user name (input tag 802) "abc" is input and the password (input tag 803) "xyz" is input and these are submitted (when login button 613 is pressed), the data shown in a line 905 is saved.

Figure 10A:
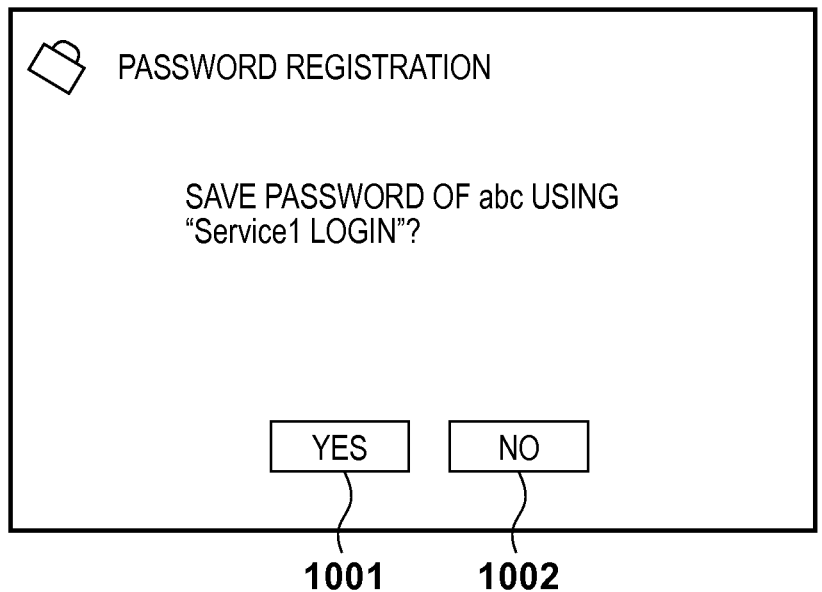
FIG. 10A and FIG. 10B depict views illustrating examples of a dialog displayed on the console unit when, in the MFP according to the first embodiment, a user name and a password are input via the screen shown in FIG. 6A or FIG. 6B, and a login button is pressed.
Figure 10B:
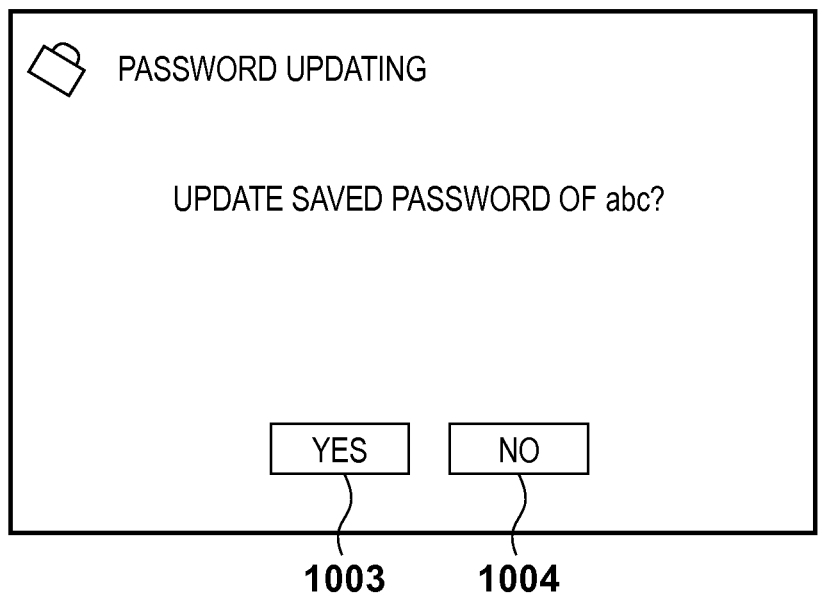

FIGS. 10A and 10B depict views illustrating examples of dialogs which are displayed on the console unit 221 when the user name and the password are input via the screens shown on FIGS. 6A and 6B, and the login button 613 is pressed in the MFP 110 according to the first embodiment.

FIG. 10A illustrates an example of a screen displayed in a case where a set of the site url 901 of FIG. 9 and the input id 903 is not registered in the form data table 409. A "YES" button 1001 is a button for designating that submitted form-based authentication information be saved in the form data table 409. When this "YES" button 1001 is selected, a set of the user name and the password inputted via the screen of FIG. 6A or FIG. 6B is saved in the line 905 of FIG. 9, for example. A "NO" button 1002 is a button for designating that processing continues without saving the submitted form-based authentication information.

FIG. 10B illustrates an example of a screen displayed in a case where a set of the url 901 of the site and the id 903 exist in the form data table 409, but the password 904 is different to the submitted password. A "YES" button 1003 is a button for overwriting and updating information of the password 904 of the form data table 409 with the submitted data. A "NO" button 1004 is a button for continuing processing without saving the submitted data. In a case where the information registered in the form data table 409 completely matches the submitted form-based authentication information, processing is continued without the screens of FIG. 10A and FIG. 10B being displayed.

Figure 11A:
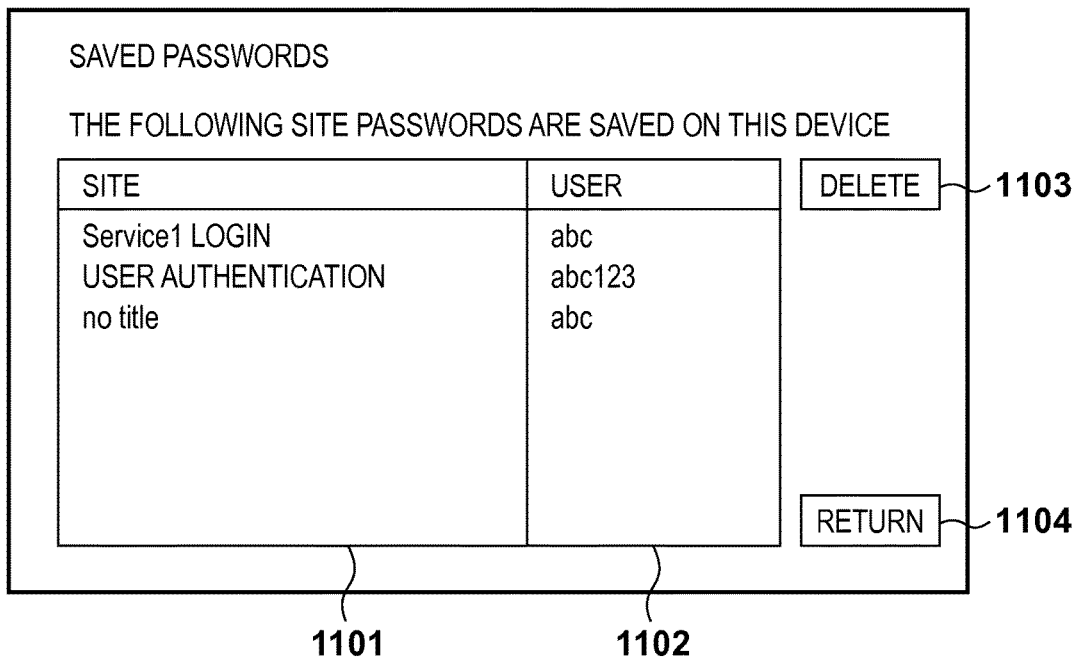
FIG. 11A and FIG. 11B depict views illustrating examples of a confirmation screen that displays form-based authentication information registered in a form data table in the MFP according to the first embodiment.
Figure 11B:
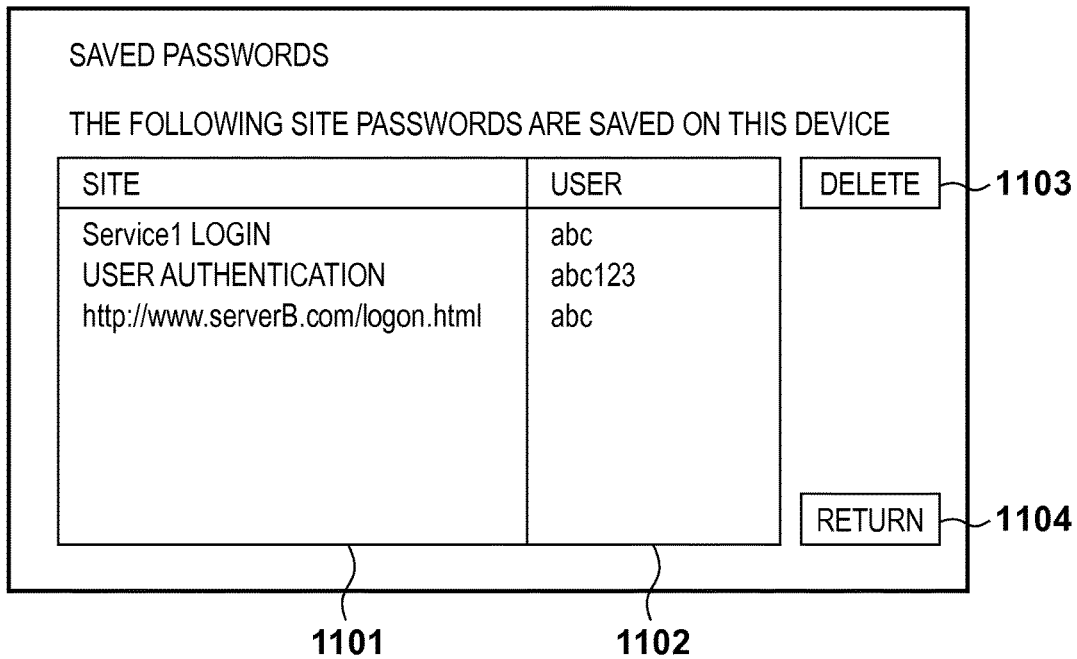

FIG. 11A and FIG. 11B depict views illustrating examples of screens displayed in a case where, in the MFP 110 according to the first embodiment, an example of a confirmation screen displaying form-based authentication information registered in the form data table 409 is shown, and the form-based authentication information shown in FIG. 9 is saved. In the confirmation screen in FIGS. 11A and 11B, a title of the login screen, or a user name in association with a URL of the Web server 120 is displayed.

FIG. 11A illustrates an example of a screen in a case where in the setting screen of later explained FIG. 12, the setting is to not display the URL in the site name (the "not display" button is selected).

Figure 12:
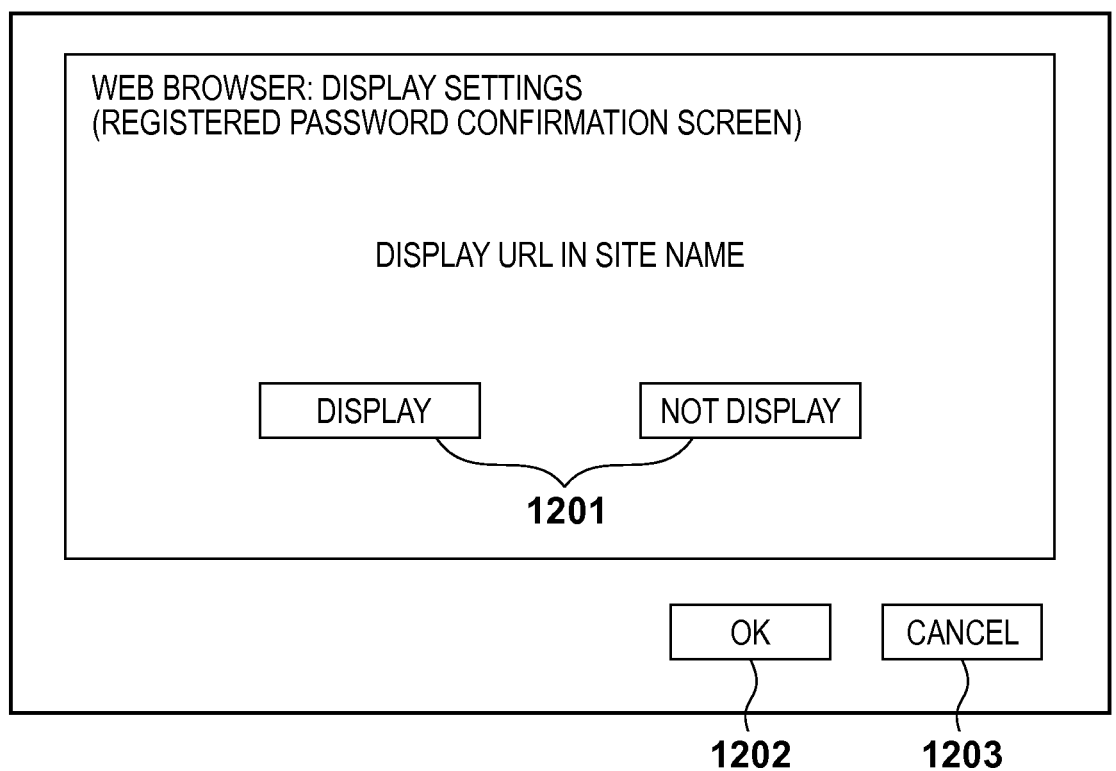
FIG. 12 depicts a view illustrating an example of a setting screen for performing a display setting of the confirmation screen of FIG. 11A or FIG. 11B in the MFP according to the first embodiment.

FIG. 11B indicates an example of a screen in a case where in the setting screen of FIG. 12 the URL is displayed in the site name (the "display" button is selected).

A site name display area 1101 is an area for displaying the site name, and display content, in a case where there is no title tag in the HTML data of FIG. 8, changes depending on the setting content of the setting screen of FIG. 12. In this example, as illustrated in FIG. 9, the URL "http://www.serverB.com/logon.html" does not have the title 902. For this reason, a predetermined character string "no title" is displayed in FIG. 11A and the url is displayed in FIG. 11B. Note that the character string that is displayed in a case where the setting is such that the URL is not displayed is not limited to the example of FIG. 11A, and other character string may be displayed.

A user name display area 1102 is an area for displaying the content of the id 903 corresponding to the site name. A delete button 1103 is a button for deleting form-based authentication information that is saved. By selecting the row of the item that the user wishes to delete from out of the items displayed in the list in FIG. 11A or FIG. 11B and pressing the delete button 1103, it is possible for the user to delete the information saved in the form data table 409. A return button 1104 is a button for closing this screen and returning to a screen displayed immediately before.

FIG. 12 depicts a view illustrating an example of a setting screen for performing a display setting of the confirmation screens of FIG. 11A or FIG. 11B in the MFP 110 according to the first embodiment.

When a Web browser display setting (register password confirmation screen) (not shown) in a setting screen (not shown) of the MFP 110 is selected, the screen shown in FIG. 12 is displayed. Selection buttons 1201 are buttons for selecting exclusively whether to display or to not display a URL in the site name, and always either "display" or "not display" is in a selection state (a pressed state). In other words, when one of the buttons is pressed, the button enters the selected state, and the other button enters a deselected state. An OK button 1202 is a button for confirming the setting content selected with the selection buttons 1201. A cancel button 1203 is a button for leaving the setting screen without performing the settings made via the screen. By modifying the setting content with the selection buttons 1201 and pressing the OK button 1202, it is possible to switch whether to set the content displayed on the site name display area 1101 of FIG. 11A and FIG. 11B to be a URL or a predetermined character string.

Figure 13:
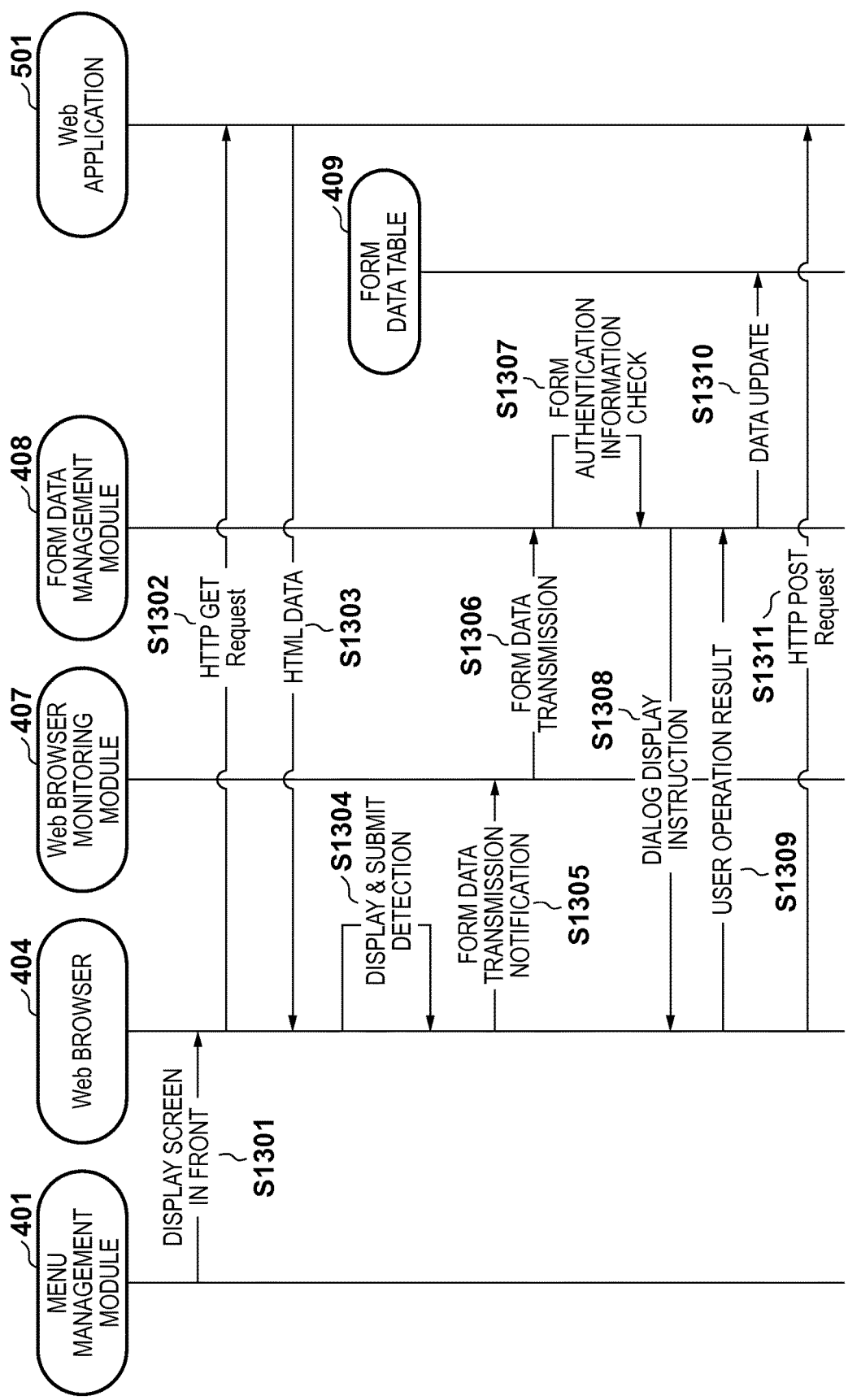
FIG. 13 is a sequence diagram for explaining a flow of a processing sequence for form-based authentication information registration processing by the MFP according to the first embodiment.

FIG. 13 is a sequence diagram for explaining a flow of a processing sequence for form-based authentication information registration processing by the MFP 110 according to the first embodiment.

When, after the user logs into the MFP 110, the user presses a function button (not shown) of the browser from a menu, the menu management module 401 detects the pressing of the button. When the menu management module 401 detects the pressing of the button, firstly, in step S1301, the menu management module 401 makes an instruction to the Web browser 404 such that a Web browser screen is displayed in front, and makes an instruction to load a URL linked to the button. Next, in step S1302, the Web browser 404, in accordance with the instruction from the menu management module 401, makes a request to the Web application 501 by an HTTP GET command. With this, in step S1303, the Web application 501 responds to the request from the Web browser 404, and responds with HTML data (the HTML data of FIG. 8, for example) for form-based authentication for usage of the Web application 501. With this, in step S1304, the Web browser 404 renders the received HTML data, and displays a screen as shown in FIG. 6A or FIG. 6B, for example, on the console unit 221. Note that, in this case, the login screen of FIG. 6A or FIG. 6B is displayed in accordance with the setting for display or non-display of the address bar/toolbar as explained with reference to the previously described FIG. 7.

Then, an operation of a user is performed via the login screen, and when the Web browser 404 detects a pressing of the submit button (login button 613), the Web browser 404, in step S1305, transmits a form data transmission notification to the Web browser monitoring module 407. When the Web browser monitoring module 407 receives the form data transmission notification from the Web browser 404, the Web browser monitoring module 407, in step S1306, transmits the content of the form data to the form data management module 408. With this, the form data management module 408, in step S1307, receives the form data, and checking the form-based authentication information stored in the form data table 409, determines whether or not the confirmation dialog of FIG. 10A or FIG. 10B, for example, should be displayed. In other words, it is determined whether or not the form data is new or if the password is modified.

When it is determined that the confirmation dialog should be displayed, a display instruction of a dialog, as shown in FIG. 10A or FIG. 10B, for example, is transmitted to the Web browser 404 in step S1308. With this, the Web browser 404, in step S1309, displays the confirmation dialog screen (FIG. 10A or FIG. 10B) instructed in step S1308, receives an instruction from the user, and notifies the form data management module 408 of the result in step S1309. With this, the form data management module 408, in step S1310, receives the user instruction result, and updates the data of the form data table 409. Then, the Web browser 404, in step S1311, transmits the HTTP POST request to the Web application 501 when the login button 613 is pressed in the screen of FIG. 6A or FIG. 6B, for example. With this, after the user logs in, the application screen is displayed.

Figure 14:
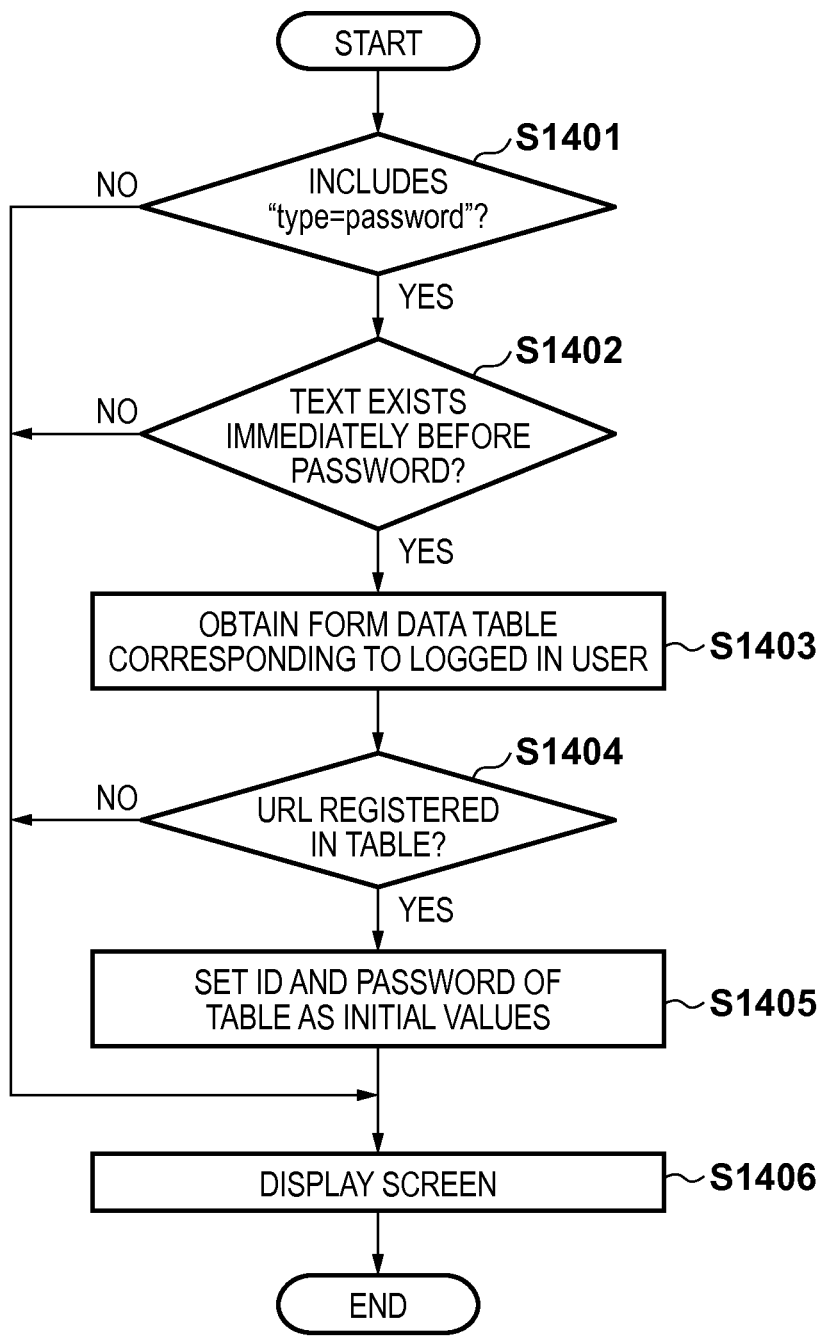
FIG. 14 is a flowchart for describing processing for when the Web browser of the MFP according to the first embodiment displays a browser screen after receiving HTML data from the Web application.

FIG. 14 is a flowchart for describing processing for when the Web browser 404 of the MFP 110 according to the first embodiment displays a browser screen after receiving HTML data from the Web application 501. Note that a program that executes this processing is stored in the HDD 204, and the processing is realized by deploying the program into the RAM 203 and by the CPU 201 executing the program. Accordingly, explanation of the flowchart hereinafter is given having the CPU 201 be the subject of each step.

This processing is started upon the Web browser 404, in step S1303 of FIG. 13, receiving HTML data, for example. Firstly, in step S1401, the CPU 201 determines whether or not an input tag, which has a type attribute of "password" is included in the form of the received HTML data. In a case where it is determined that the input tag having the type attribute of "password" is not included, the processing proceeds to step S1406. In a case where it is determined that the input tag having a type attribute of "password" is included, the password is obtained, the processing proceeds to step S1402, and the CPU 201 searches for an input tag having an type attribute of "text" existing before the input tag. If an input tag (user name input tag) for which the type attribute is "text" does not exist before the input tag for which the type attribute is password, the processing proceeds to step S1406. In a case where the input tag for which the type attribute is "text" does exist, the user name is obtained, the processing proceeds to step S1403, and the CPU 201 obtains a table of form-based authentication information corresponding to a login user of the MFP 110 (FIG. 9) via the form data management module 408. Next, the processing proceeds to step S1404, and the CPU 201 determines whether or not information relating to the URL of the transmission source of the HTML data is registered in the form data table 409. In a case where it is determined that information relating to the URL of the transmission source of the HTML data is not registered, the processing proceeds to step S1406, and in a case where it is determined that information relating to the URL of the transmission source of the HTML data is registered, the processing proceeds to step S1405. In step S1405, the CPU 201 sets information for the id (user name) and password associated with the corresponding URL of the form data table 409 as initial values of the input tags obtained in step S1401 and step S1402, and the processing proceeds to step S1406. In step S1406, the CPU 201 renders the received HTML data, and displays the screen as shown in FIG. 6A or FIG. 6B, for example.

By performing this kind of processing, it is possible to set authentication form information including a user name and a password that was input in the past in association with a URL of a transmission source of the HTML data as an initial value automatically.

Figure 15:
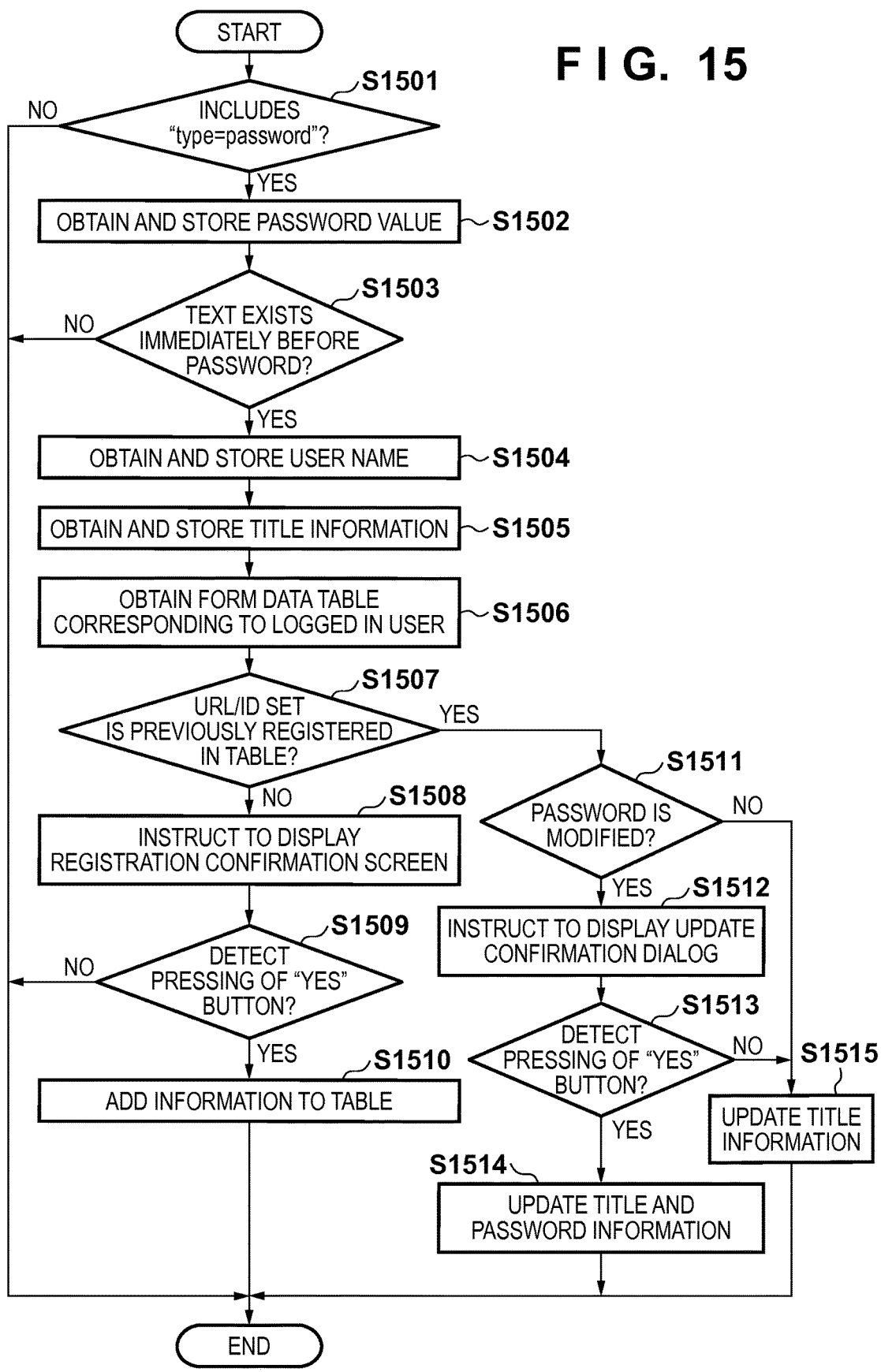
FIG. 15 is a flowchart for describing details of processing performed in step S1307 through step S1310 after the form data management module of the MFP according to the first embodiment receives form data in step S1306 of FIG. 13.

FIG. 15 is a flowchart for explaining details of processing performed in step S1307 through step S1310 after the form data management module 408 of the MFP 110 according to the first embodiment receives form data in step S1306 of FIG. 13. Note that a program that executes this processing is stored in the HDD 204, and the processing is realized by deploying the program into the RAM 203 and by the CPU 201 executing the program. Accordingly, explanation of the flowchart hereinafter is given having the CPU 201 be the subject of each step.

The processing is initiated upon reception of form data from the Web browser 404, and the CPU 201, in step S1501, determines whether or not the received form data includes an input tag for which the type attribute is "password". In a case where it is determined that this kind of input tag is not included, the processing completes. In a case where it is determined that an input tag for which the type attribute is "password" is included, the processing proceeds to step S1502, and the CPU 201 stores the password inputted into the form as password information. Next, the processing proceeds to step S1503, and the CPU 201 searches for an input tag for which the type is "text" (user name) existing before the input tag for which the type attribute is "password". If such an input tag does not exist, the process is terminated. In a case where it is determined that an input tag for which the type attribute is "text" does exists in step S1503, the processing proceeds to step S1504, and the value inputted into the form having the type attribute of "text" is obtained as the user ID (user name) and stored. Next, the processing proceeds to step S1505, and the CPU 201 obtains and stores a value marked up in a title tag as the title information. Note that here if there is no title tag, it is stored that the title information does not exist.

Next, the processing proceeds to step S1506, and the CPU 201 obtains a table of form-based authentication information (FIG. 9) corresponding to a logged in user from the form data table 409. Next, the processing proceeds to step S1507, and the CPU 201 determines whether or not a set of information relating to the URL of the destination to transmit the form data and the user ID information stored in step S1504 is registered previously in the form data table 409. If it is determined that the set is not registered, the processing proceeds to step S1508, and the CPU 201 outputs a display instruction for displaying a registration confirmation dialog as shown in FIG. 10A, for example, to the Web browser 404. Then, the processing proceeds to step S1509, and the CPU 201 receives a user operation result via the screen from the Web browser 404 and determines the operation of the user. Here, in a case where it is determined that the "YES" button 1001 is pressed, the processing proceeds to step S1510, and in a case where it is determined that a press operation is perform on a button other than the "YES" button 1001, the process is terminated. The CPU 201, in step S1510, associates the URL of the Web application 501, and the user ID information, the password information, and the title information stored in step S1502, step S1504, and step S1505. Then the CPU 201 newly registers these in the form data table 409 of the login user, and the process is terminated.

By this processing, the user of the MFP 110 is able to register the user name and the password inputted in a service login screen, such as that of FIG. 6A or FIG. 6B for example, in addition to a URL which is a supply source of the screen, a title of the screen, or the like.

Meanwhile, in a case where the CPU 201, in step S1507, determines that the set of the URL and the user ID information are previously registered, the processing proceeds to step S1511. In step S1511, the CPU 201 determines whether or not the password information obtained in step S1502, and the password registered in the form data table 409 match. Here, in a case where it is determined that the passwords do not match, the processing proceeds to step S1512, and in a case where it is determined that the passwords match, the processing proceeds to step S1515. In step S1515, the CPU 201 updates the title information associated with the URL of the Web application 501 of the form data table 409 of login user to be the title information obtained and saved in step S1505, and the processing ends. With this, it is possible to obtain title information when displaying a login screen, as shown in FIG. 6A or FIG. 6B, for example, and update the title 902 of the form data table 409.

Meanwhile, when the password is modified, the processing proceeds to step S1512 from step S1511, and the CPU 201 outputs a display instruction for displaying the confirmation dialog as shown in FIG. 10B, for example, to the Web browser 404. Then, the processing proceeds to step S1513, and the CPU 201 receives a user operation result via the screen from the Web browser 404 and determines the operation of the user. Here, in a case where the CPU 201 determines that the "YES" button 1003 is pressed, the processing proceeds to step S1514, and in a case where it determines that an operation of a button other than the "YES" button 1003 is performed, the processing proceeds to step S1515. In step S1514, the CPU 201 updates the information associated with the URL of the Web application 501 of the form data table 409 of the logged in user to be the password information and the title information obtained in step S1502 and step S1505, and the processing ends.

As explained above, by virtue of the processing illustrated in this flowchart, in a case where a password inputted on a service login screen such as that of FIG. 6A or FIG. 6B, for example, and a password registered previously are different from each other, a confirmation screen for confirming whether or not to update the password is displayed. Then, when an update is instructed on the confirmation screen (such as FIG. 10B), it is possible to update the previously registered password. Also, when the form-based authentication information of the user that is logged in is not registered, the user name and the password inputted on the service login screen can be registered easily via the confirmation screen (such as FIG. 10A) in addition to the URL which is the supply source of the screen, and the title of the screen, or the like.

Figure 16:
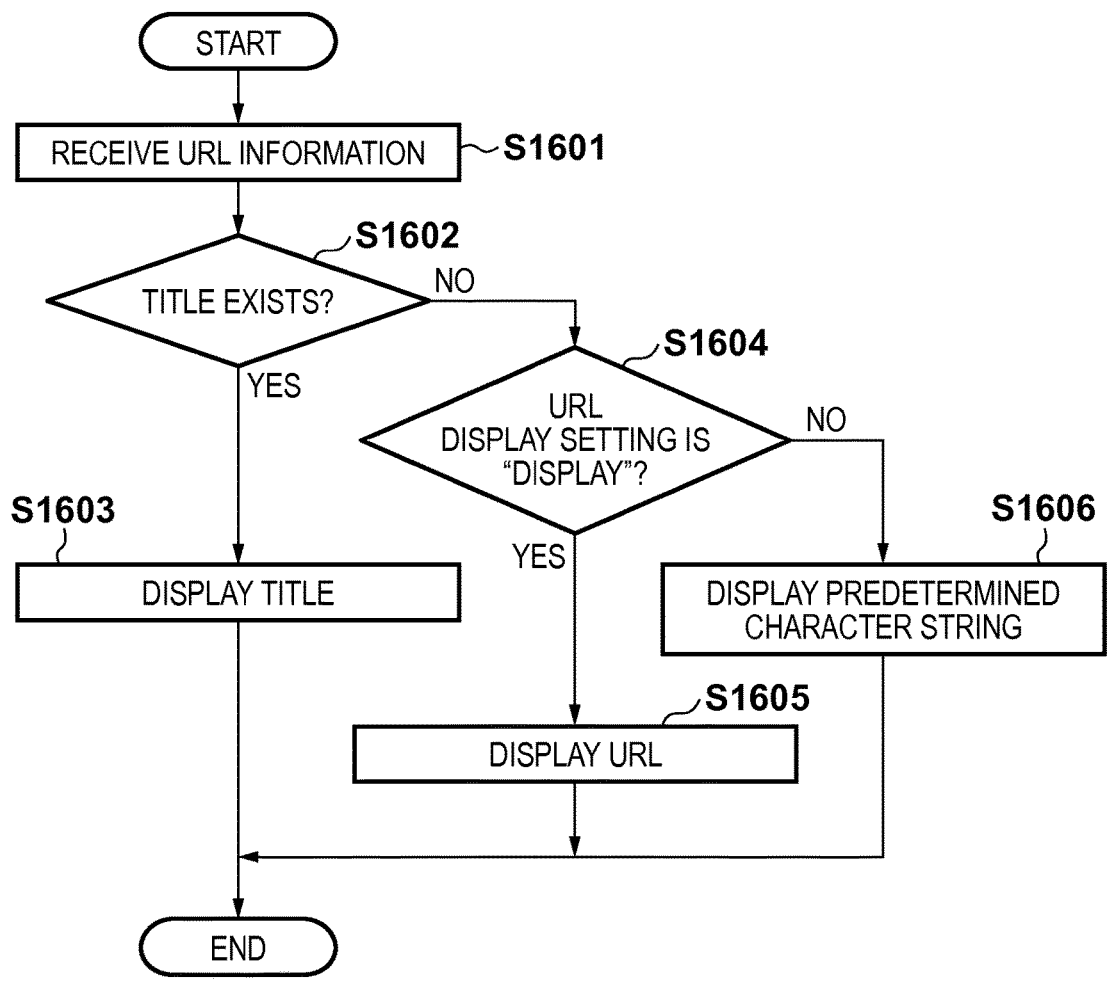
FIG. 16 is a flowchart for describing processing for determining a character string displayed to a site name display area of a registered password confirmation screen in the MFP according to the first embodiment.

FIG. 16 is a flowchart for describing processing for determining a character string displayed to a site name the display area 1101 of a registered password confirmation screen in the MFP 110 according to the first embodiment. Note that this processing is executed by the form data management module 408. Here, as shown in FIG. 11A or FIG. 11B, for example, the form data display module 411 queries the form data management module 408 as to which content should be displayed in the site name display area when each line of the list is rendered. The form data management module 408 performs the processing below in accordance with the query from the form data display module 411, and returns a display character string. Note that a program that executes this processing is stored in the HDD 204, and the processing is realized by deploying the program into the RAM 203 and by the CPU 201 executing the program. Accordingly, explanation of the flowchart hereinafter is given having the CPU 201 be the subject of each step.

Firstly, in step S1601, the CPU 201 receives URL information from the form data display module 411. Next, the processing proceeds to step S1602, and the CPU 201 searches the form data table 409 of the logged in user, and determines whether or not title information associated with the received URL exists. Here, in a case where it is determined that the title information exists, the processing proceeds to step S1603, and the CPU 201 returns a character string indicating the title information, and the process is terminated.

Meanwhile, in a case where the CPU 201, in step S1602, determines that there is no title information, the processing proceeds to step S1604. In step S1604, the CPU 201 determines the content of the URL display setting set on the setting screen shown in FIG. 12, for example. In a case where the CPU 201, in step S1604, determines that it is set such that the URL is displayed in the site name, the processing proceeds to step S1605, and it is set such that the character string of the URL is displayed as the site name, for example, as in FIG. 11B, and the processing completes. Also, in a case where the CPU 201, in step S1604, determines that the setting is such that the URL is not displayed in the site name, the processing proceeds to step S1606, and a predetermined character string (for example, "no title" in the example of FIG. 11A) is set to be displayed, and the processing completes.

By the first embodiment, as explained above, when the registered form-based authentication information is displayed, in a case where there is no title information, it is possible to switch the display content to be the URL or to be some other character string. With this, because it is not necessary to display the URL in an environment in which a general user cannot recognize the URL, the user is not caused to be confused, and convenience is improved.

[Second Embodiment]

In the first embodiment described above, explanation was given for an example in which it is possible to set whether the content displayed in the site name of the confirmation screen for confirming the form-based authentication information is a URL or some other character string. In contrast to this, in the second embodiment, an example is illustrated in which the display content is automatically switched in coordination with a display setting of an address bar of the Web browser. Because the only differences with the first embodiment are the existence or absence of the setting screen of FIG. 12 and the determination processing for determining the character string that should be displayed as the site information of FIG. 15, explanation for the overall configuration of the system, the hardware configuration, and the software module configuration is omitted.

In the second embodiment, the setting screen as shown in FIG. 12 does not exist because switching of the display content is performed in coordination with the address bar/toolbar setting of the Web browser 404.

Figure 17:
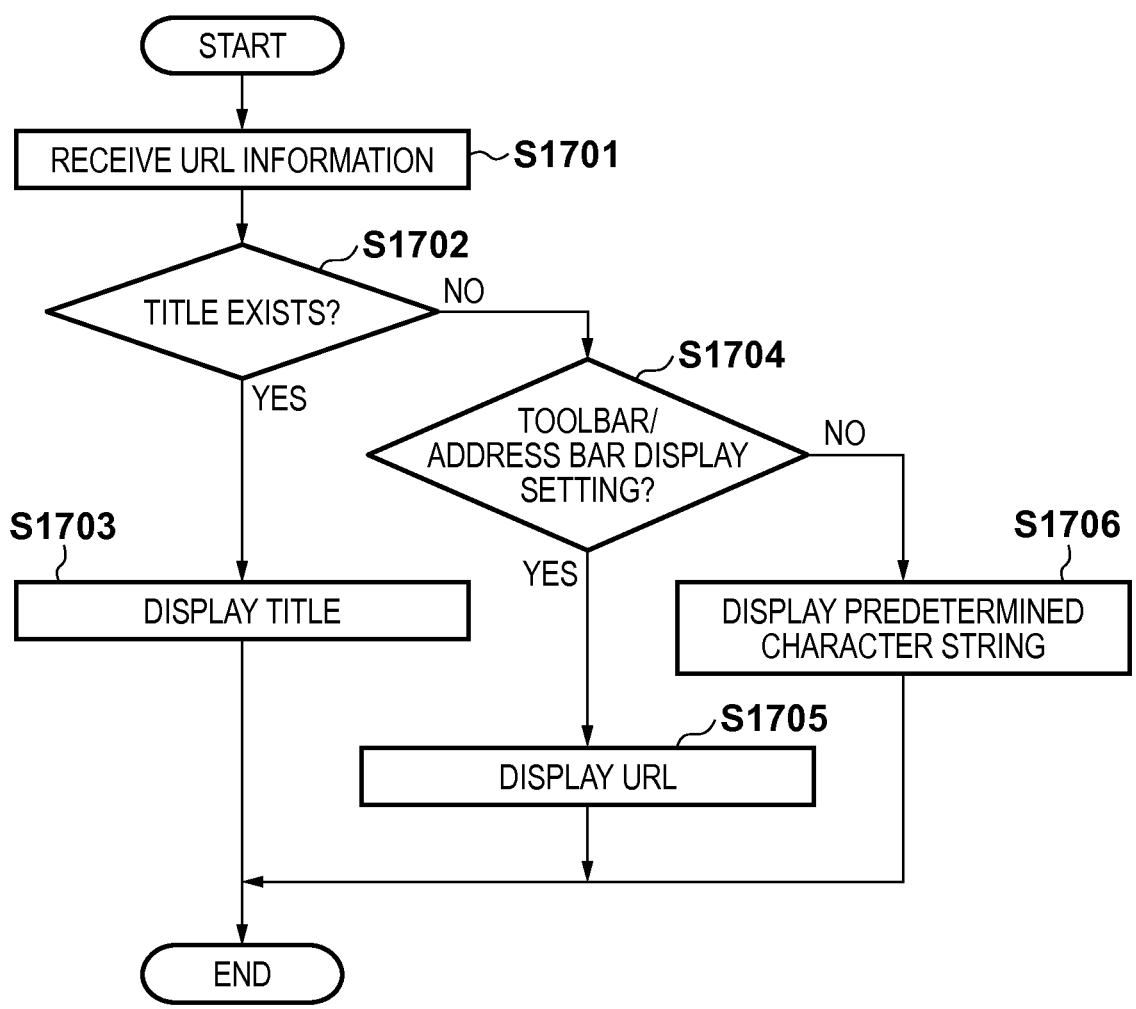
FIG. 17 is a flowchart for describing processing for determining a character string displayed to a site name display area of a registered password confirmation screen in the MFP according to a second embodiment.

FIG. 17 is a flowchart for describing processing for determining a character string displayed to a site name the display area 1101 of a registered password confirmation screen in the MFP 110 according to the second embodiment. Note that this processing is executed by the form data management module 408. Here, as shown in FIG. 11A or FIG. 11B, for example, when the form data display module 411 renders each line of the list, the form data display module 411 queries the form data management module 408 for the content that should be displayed in the site name display area. The form data management module 408 performs the processing below in accordance with the query from the form data display module 411, and returns a display character string. Note that a program that executes this processing is stored in the HDD 204, and the processing is realized by deploying the program into the RAM 203 and by the CPU 201 executing the program. Accordingly, explanation of the flowchart hereinafter is given having the CPU 201 be the subject of each step.

Firstly, in step S1701, the CPU 201 receives the URL information. Next, the processing proceeds to step S1702, and the CPU 201 searches the form data table of the logged in user, and determines whether or not title information associated with the received URL exists. Here, in a case where the CPU 201 determines that the title information exists, the processing proceeds to step S1703, sets so that the character string that indicates the title is displayed, and the processing completes.

Meanwhile, in a case where the CPU 201, in step S1702, determines that there is no title information, the processing proceeds to step S1704. In step S1704, the CPU 201 determines the content of the display setting of the address bar set on the setting screen shown in FIG. 7, for example. In a case where it is determined that the setting is for displaying the address bar, the processing proceeds to step S1705, it is set such that the character string of the URL is displayed, and the process is terminated. Also, in a case where the CPU 201, in step S1704, determines that setting is not such that the address bar is displayed, the processing proceeds to step S1706, it is set such that the predetermined character string (for example, "no title" in the example of FIG. 11A) is displayed, and the process is terminated.

By the second embodiment, as explained above, when displaying registered form-based authentication information, it is possible to switch whether to set the display content in a case where there is no title information to be the URL or whether to set the display content to be another character string in coordination with a Web browser address bar display/non-display setting. With this, in an environment in which a general user cannot recognize the URL, not displaying the URL can be realized, and user convenience can be further improved.

[Other Embodiments]

In the above described first and second embodiments, in a case where the title does not exist, a URL or a predetermined character string is displayed. However, configuration may be taken in which a character string existing in another tag or in a predetermined location in the HTML data is saved, and in a case where there is no title, this information is displayed for the site name as alternative information. For example, configuration may be taken such that a character string included immediately after a form tag including an input tag for which the type attribute is "password" is saved, and that character string is displayed in a case where there is no title information. With this, it becomes possible to improve user convenience.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-254496, filed Dec. 9, 2013, which is hereby incorporated by reference herein in its entirety.

What is claimed is:

1. An information processing apparatus comprising:
one or more processors; and
one or more memories storing instructions that, when executed by the one or more processors, cause the information processing apparatus to:
display an authentication screen based on HTML data received from a Web server;
manage authentication information inputted via the authentication screen;
set identification information of the authentication screen in a case where a title of the authentication screen does not exist; and
control to, upon a display of the managed authentication information, in a case where an address of the HTML data is set to be displayed as the identification information of the authentication screen, display the address of the HTML data in a case where the title of the authentication screen does not exist, and in a case where the address of the HTML data is not set to be displayed as the identification information of the authentication screen, display a predetermined character string in a case where the title of the authentication screen does not exist.

2. The information processing apparatus according to claim 1, wherein the address is a URL.

3. The information processing apparatus according to claim 1, wherein the one or more memories store further instructions that, when executed by the one or more processors, cause the information processing apparatus to designate the predetermined character string.

4. The information processing apparatus according to claim 1, wherein the authentication information includes the address of the HTML data, a user name and a password for each authentication screen.

5. The information processing apparatus according to claim 4, wherein the one or more memories store further instructions that, when executed by the one or more processors, cause the information processing apparatus to, in a case where authentication information, for which a set of a URL and the user name is the same as a set of the authentication information inputted via the authentication screen, is previously registered, and a password is modified, update the password of the authentication information.

6. The information processing apparatus according to claim 4, wherein the one or more memories store further instructions that, when executed by the one or more processors, cause the information processing apparatus to, in a case where authentication information, for which a set of a URL and the user name is the same as a set of the authentication information inputted via the authentication screen, is previously registered, and a password is modified, display a confirmation screen for confirming whether or not to update the password of the authentication information, and determine whether or not to update the password in accordance with an instruction of a user via the confirmation screen.

7. An information processing apparatus comprising:
one or more processors; and
one or more memories storing instructions that, when executed by the one or more processors, cause the information processing apparatus to:
display an authentication screen based on HTML data received from a Web server;
manage authentication information inputted via the authentication screen;
set whether to display or to not display an address bar on the authentication screen; and
control to, in a case where the address bar is set to be displayed, upon a display of the managed authentication information, display an address of the HTML data in a case where a title of the authentication screen does not exist, and in a case where the address bar is set to not be displayed, display a predetermined character string in a case where the title of the authentication screen does not exist.

8. The information processing apparatus according to claim 7, wherein the address is a URL.

9. The information processing apparatus according to claim 7, wherein the one or more memories store further instructions that, when executed by the one or more processors, cause the information processing apparatus to designate the predetermined character string.

10. The information processing apparatus according to claim 7, wherein the authentication information includes the address of the HTML data, a user name and a password for each authentication screen.

11. The information processing apparatus according to claim 10, wherein the one or more memories store further instructions that, when executed by the one or more processors, cause the information processing apparatus to, in a case where authentication information, for which a set of a URL and the user name is the same as a set of the authentication information inputted via the authentication screen, is previously registered, and a password is modified, update the password of the authentication information.

12. The information processing apparatus according to claim 10, wherein the one or more memories store further instructions that, when executed by the one or more processors, cause the information processing apparatus to, in a case where authentication information, for which a set of a URL and the user name is the same as a set of the authentication information inputted via the authentication screen, is previously registered, and a password is modified, display a confirmation screen for confirming whether or not to update the password of the authentication information, and determine whether or not to update the password in accordance with an instruction of a user via the confirmation screen.

13. A method of controlling an information processing apparatus that displays an authentication screen based on HTML data received from a Web server, the method comprising:
 managing authentication information inputted via the authentication screen;
 setting identification information of the authentication screen in a case where a title of the authentication screen does not exist; and
 controlling to, upon a display of the authentication information managed by the managing, in a case where the setting is performed to display an address of the HTML data as the identification information of the authentication screen, display the address of the HTML data in a case where the title of the authentication screen does not exist, and in a case where the setting is not performed to display the address of the HTML data as the identification information of the authentication screen, display a predetermined character string in a case where the title of the authentication screen does not exist.

14. A method of controlling an information processing apparatus that displays an authentication screen based on HTML data received from a Web server, the method comprising:
 managing authentication information inputted via the authentication screen;
 setting whether to display or to not display an address bar on the authentication screen; and
 controlling so that, in a case where the setting is performed such that the address bar is displayed, upon a display of the authentication information managed in the managing, an address of the HTML data is displayed in a case where a title of the authentication screen does not exist, and in a case where the setting is not performed such that the address bar is displayed, a predetermined character string is displayed in a case where the title of the authentication screen does not exist.

15. A non-transitory computer-readable storage medium storing a program for causing a computer to function as an information processing apparatus to perform steps comprising:
 displaying an authentication screen based on HTML data received from a Web server;
 managing authentication information inputted via the authentication screen;
 setting identification information of the authentication screen in a case where a title of the authentication screen does not exist; and
 controlling to, upon a display of the authentication information managed by the managing unit, in a case where the setting sets to display an address of the HTML data as the identification information of the authentication screen, display the address of the HTML data in a case where the title of the authentication screen does not exist, and in a case where the setting does not set to display the address of the HTML data as the identification information of the authentication screen, display a predetermined character string in a case where the title of the authentication screen does not exist.

16. An information processing apparatus comprising:
 one or more processors; and
 one or more memories storing instructions that, when executed by the one or more processors, cause the information processing apparatus to:
 display an authentication screen based on HTML data received from a Web server;
 manage authentication information inputted via the authentication screen;
 set identification information of the authentication screen in a case where a title of the authentication screen does not exist; and
 control to, upon a display of the managed authentication information, in a case where an address of the HTML data is set to be displayed as the identification information of the authentication screen, display the address of the HTML data in a case where the title of the authentication screen does not exist, and in a case where the address of the HTML data is not set to be displayed as the identification information of the authentication screen, not to display the address of the HTML data in a case where the title of the authentication screen does not exist.

17. The information processing apparatus according to claim 16, wherein the authentication information includes the address of the HTML data, a user name and a password for each authentication screen.

18. The information processing apparatus according to claim 17, wherein the one or more memories store further instructions that, when executed by the one or more processors, cause the information processing apparatus to, in a case where authentication information, for which a set of a URL and the user name is the same as a set of the authentication information inputted via the authentication screen, is previously registered, and a password is modified, display a confirmation screen for confirming whether or not to update the password of the authentication information, and determine whether or not to update the password in accordance with an instruction of a user via the confirmation screen.

19. A method of controlling an information processing apparatus that displays an authentication screen based on HTML data received from a Web server, the method comprising:
 managing authentication information inputted via the authentication screen;
 setting identification information of the authentication screen in a case where a title of the authentication screen does not exist; and
 controlling to, upon a display of the authentication information managed by the managing, in a case where the setting is performed to display an address of the HTML data as the identification information of the authentication screen, display the address of the HTML data in a case where the title of the authentication screen does not exist, and in a case where the setting is not performed to display the address of the HTML data as the identification information of the authentication screen, not to display the address of the HTML data in a case where the title of the authentication screen does not exist.

20. A non-transitory computer-readable storage medium storing a program for causing a computer to function as an information processing apparatus to perform steps comprising:
 displaying an authentication screen based on HTML data received from a Web server;
 managing authentication information inputted via the authentication screen;
 setting identification information of the authentication screen in a case where a title of the authentication screen does not exist; and controlling to, upon a display of the managed authentication information, in a case where the setting sets to display an address of the HTML data as the identification information of the authentication screen, display the address of the HTML data in a case where the title of the authentication screen does not exist, and in a case where the setting does not set to display the address of the HTML data as the identification information of the authentication screen, not to display the address of the HTML data in a case where the title of the authentication screen does not exist.

* * * * *